Oct. 23, 1934.  W. M. LEE  1,977,770
AUTOMATIC CASSETTE CHANGER
Filed July 14, 1933   2 Sheets-Sheet 1
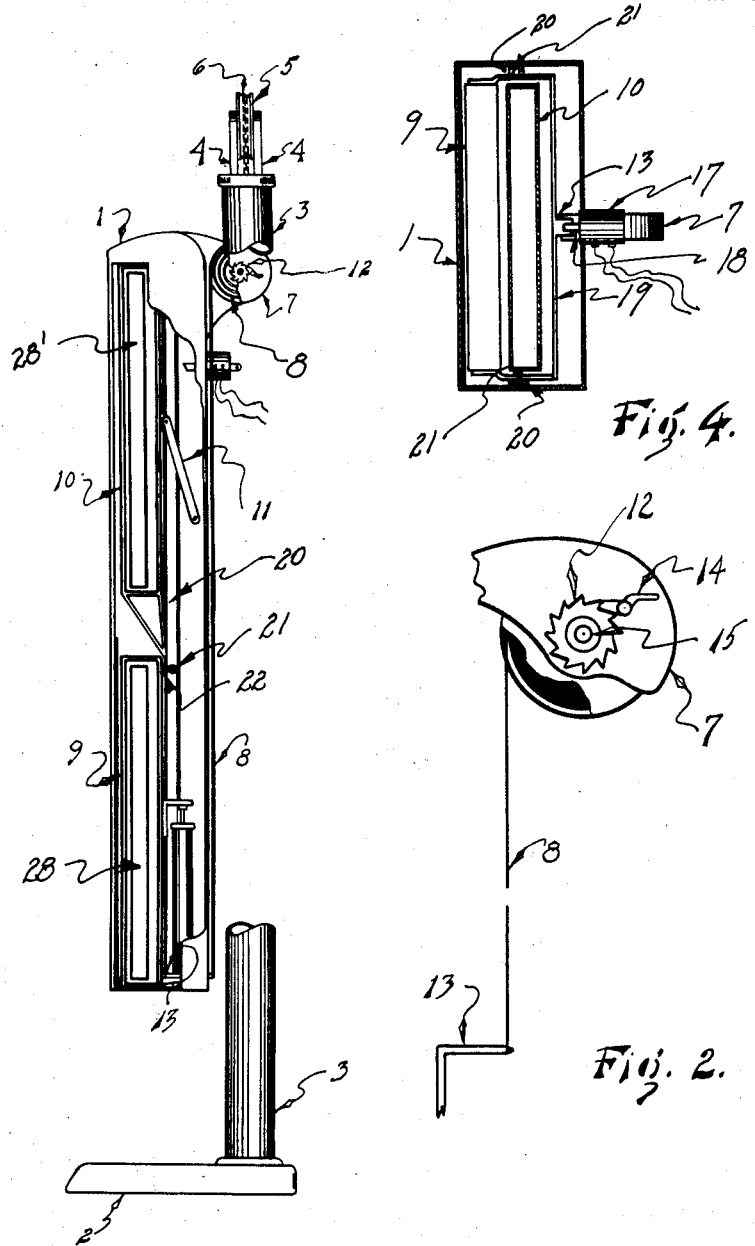
INVENTOR.
WILLIAM M. LEE
BY Chester Freting
ATTORNEY.

Oct. 23, 1934.  W. M. LEE  1,977,770

AUTOMATIC CASSETTE CHANGER

Filed July 14, 1933    2 Sheets-Sheet 2

INVENTOR.
WILLIAM M. LEE
BY
Chester Tietig
ATTORNEY.

Patented Oct. 23, 1934

1,977,770

UNITED STATES PATENT OFFICE 1,977,770

AUTOMATIC CASSETTE CHANGER

William Maxwell Lee, Covington, Ky., assignor to Kelley-Koett Mfg. Co., Inc., Covington, Ky., a corporation of Ohio Application July 14, 1933, Serial No. 680,444

7 Claims. (Cl. 250—34)

This invention relates to an automatic changer for photographic films or plates contained in cassettes. It is especially intended for use in X-ray work in which the exposures are to be made with a very short time interval between them. The necessity for this technique arises in stereoscopic X-ray work. The more the time interval between exposures can be shortened, the more accurate and trustworthy will be the diagnosis based upon the film. It is the function of this apparatus to shift the second film into exposure position after the first one has been exposed.

The object of the invention therefore, is to provide a cassette changer in which a second exposure can be made after a very short interval, and in which the cassette holder, after being relieved of the cassette, will automatically return to the ready position. Fresh loaded cassettes need then only be slipped into the cassette holders in order to make the apparatus ready for further exposures.

Broadly stated, the principle involved resides in the use of cassettes of such a weight that they are capable of overbalancing the pull of a spring attached to a cassette holder. Conversely it may be stated to reside in the use of a spring of such a tension as to be able to handle the cassettes in the manner described. The tripping of an electromagnetic release allows overbalancing to take place. Removal of the exposed cassette thereupon allows the cassette pan or holder to return to its original or cocked position.

Referring now to the accompanying drawings, Fig. 1 is a side elevation of the cassette changer with most of the side wall removed to show the interior.

Fig. 2 is a detail in side elevation of the spring and ratchet return mechanism.

Fig. 4 is a cross section of Fig. 3 along the line A—A thereof, looking upward. It shows in detail the means employed to control one cassette holder while leaving the other free from interference.

Figure 3:
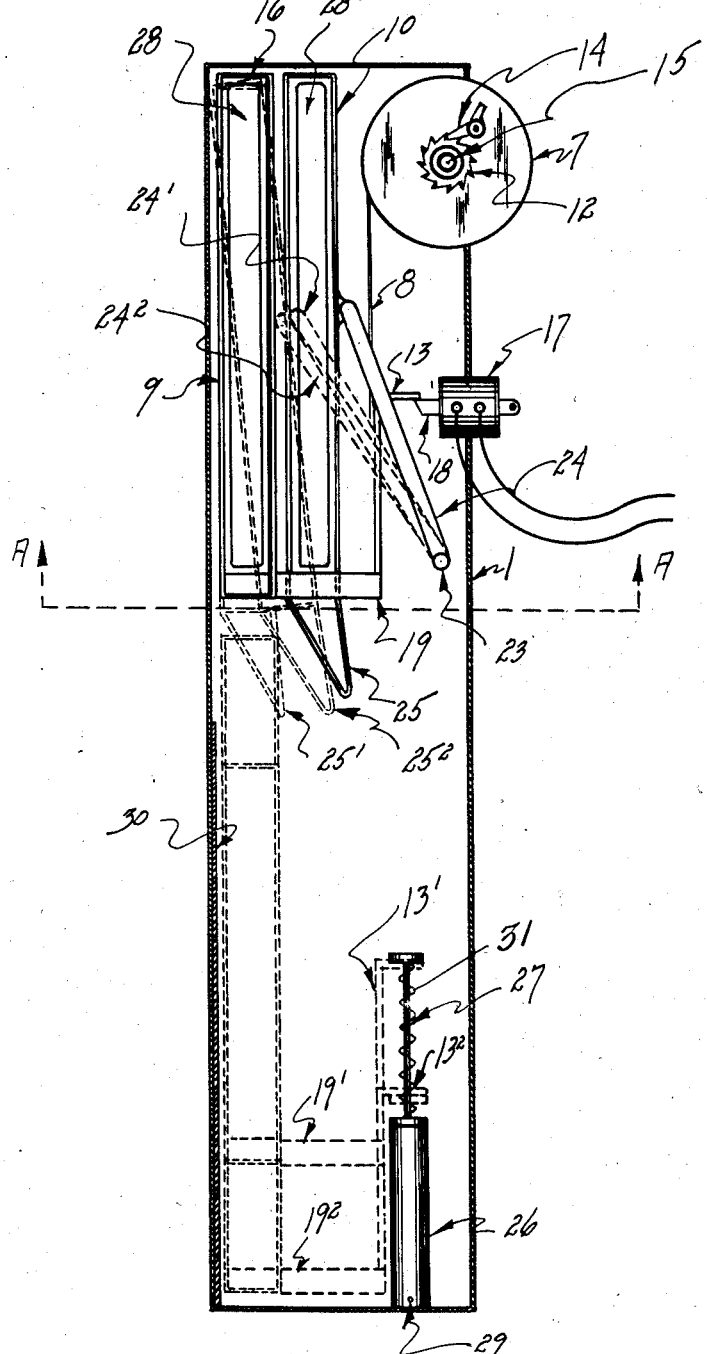
Fig. 3 is an enlarged view in side elevation of the cassette holder changing mechanism, the operation of which is indicated by dotted lines which show the extended position of the mechanism.

Referring to Fig. 1, the machine consists in general of a case the rear of which is of metal but the top front of which is of radioparent material. The case contains the operating mechanism, and its contents are supported by a column 3 which, with a heavy base 2, forms a standard. Adjustment to various heights is provided by a pulley 5 at the top of column 3, the pulley revolving between a pair of supports 4. A chain 6 passes over pulley 5. One end is connected to the case 1 and the other end to a counterweight which can rise and fall within the column 3. However, these details are not shown, since they are conventional. The lower part of the front of case 1 has a lead backing 30.

Within a housing 7, attached to the base of case 1, there is a heavy spiral spring (not shown) and a coil 8 of flat wire, shown in detail in Fig. 2. The extensible end of the flat wire is fastened to a projection 13 which is a metal strap controlling the first cassette holder 9 which is capable of travel from the top to the bottom of case 1 and vice versa. There are two cassette holders, the second one being indicated by 10, but the latter is capable only of a short movement.

The upward pull of flat wire 8 may be adjusted by means of a ratchet 12 which is tightly mounted upon the spring drum shaft 15, and a pawl 14 which is mounted on the housing 7. No novelty is claimed for such arrangement per se for the reason that the principle is common in window shade rollers. Its presence in a cassette changing apparatus is however, believed to be novel. In this case, the wire 8 corresponds to the shade, the actuating spring is, however, inside the housing 7 and is so not shown. It works however, and it may be built precisely like the spring contained within an ordinary shade roller.

Since the cassette holder 9 will be the first one exposed to X-rays and since it lies in front of holder 10 while being so exposed, it is necessary to provide X-ray-stopping material in front of the second cassette. Accordingly, the back of holder 9 is covered on its inner surface with a sheet of lead 16. Since the lead makes the holder 9 quite heavy, it is not advisable to depend upon the tension of a spring to hold it in cocked or operating position. Accordingly an electromagnet 17 is provided in the back of the case 1, the core 18 of which is retractible, but which normally extends forward except when the magnet is energized. The lower edge of this core is bevelled in order to form a trigger.

Engaging trigger 18 there is the extension 13 which is a metal strap. It is this engagement which prevents cassette holder 9 from falling until the magnet 17 is energized. Attachment of the strap to the cassette holder 9 is not direct, for the reason that a direct attachment would interfere with the movement of cassette holder 10. As Fig. 4 shows, however, strap 13 is attached to a metal bow 19 which extends around cassette holder 10, leaving room for its motion. The ends of the bow are attached to the edges of cassette holder 9.

Fig. 4 also shows guides 20 which are vertical grooves adapted to keep cassette holder 9 vertical while its position is being changed. Engagement of the cassette holder with the groove is preferably thru rollers 21 which stand out somewhat from the back of the holder on the edges thereof from the end of a flat metal fin 22, shown in Fig. 1. When holder 9 returns to its upper position, holder 10 slides into the space between rollers 21.

In order to ensure a forward falling action for holder 10 immediately after the fall of holder 9, the former is supported on a pair of cross-shafts 23 by a link 24 which is always leaning forward. Only one such link 24 is shown, but the other is a corresponding position on the rear edge of holder 10. Cross shaft 23 is rigidly supported in holes in case 1. The connections of link 24 to both shaft and to holder 10 are pivots. On the lower end of holder 10 there is a triangular guide 25 which extends all the way across the holder. The apex of this guide is so constructed that its apex will lie at all times outside the vertical plane of the fallen cassette holder 9. This position is shown in dotted line as $25^1$. An intermediate position is also indicated in dotted line as $25^2$. Since the apex lies outside the plane, upward movement of holder 9 from its fallen position will at all times tend to push holder 10 to the rear and also upward, so that the successive positions of link 24 will be $24^2$ (dotted) $24^1$ (dotted) and finally 24.

The falling of holder 9 would be attended with considerable shock if the fall were unbroken. Easing the fall is of great importance on account of the desirability of vibrationless operation and avoidance of destructive shock to the cassettes and contents thereof. To this end a vertical air cylinder 26 containing a double ended piston 27, is provided on the rear of the floor formed by the bottom of case 1. The position is such that the strap end 13 will engage squarely the top of the piston 27 when the holder 9 falls, and compress the air within the cylinder by driving the piston down. The air escapes slowly from hole 29 in the bottom of the cylinder. The successive positions of strap 13 are indicated in dotted line as $13^1$ and $13^2$ (final or lowest position). Holder 9 of course, assumes corresponding positions which are also indicated in dotted line and are demarcated by the positions of the bow, $19^1$ and $19^2$. A spiral spring 31, is provided to return piston 27 to its original position after the weight of holder 9 is taken from it.

The sequence of steps when operating the plate changer is as follows, altho some variation is permissible. As shown in Fig. 3, cassettes 28 and $28^1$, containing fresh plate or film, are loaded into holders 9 and 10 respectively. The holders remain stationary, being held by trigger 18. An X-ray photograph is now made thru the patient, who stands in front of the apparatus, the case 1 of which, with contained mechanism, is moved up or down on the standard to be brought to adjustment with the patient. The lead backing on cassette holder 9 prevents the X-rays from affecting the film or plate in cassette $28^1$. The first exposure being complete, electro-magnet 17 is energized, causing withdrawal of trigger 18 which allows cassette holder 9 to drop and strap 13 to engage piston 27, thereby easing the fall. Cassette holder 10 now falls forward into the position just occupied by holder 9, because links 24 were off dead center position, being inclined forward. A second radiograph is now made thru the patient, and the plate or film affected is now the one in cassette $28^1$. This cassette is now removed from the holder and then the one from the holder which has fallen. Lead backing 30 has prevented fogging of the film in the fallen cassette during exposure of the second one. The consequent lightening of holder 9 enables it to be lifted by the spring in case 7, to its former position. In assuming this position, it pushes holder 10 upward and backward thru engaging the oblique surface of guide 25. Holder 10 is thus swung about the shaft 23 into its original position. Meanwhile holder 9 by means of strap 13 has engaged the bevelled surface of trigger 18 and temporarily pushed it back. The trigger 18 is returned to a position under the strap 13 by a spring (not shown) inside the electro-magnet. The holders are once more firmly supported. Spring 31 returns piston 27, making the shock absorbing cylinder again ready. Freshly loaded cassettes are now placed in the holders and the apparatus is ready for another cycle.

I claim as my invention:—

1. In a cassette changer, a plurality of cassette holders; means for retaining said cassette holders against the force of gravity, remotely controllable electrical means for releasing said holders whereby at least one of them is allowed to fall, guiding means for making the fall substantially vertical, retracting means actuated by the force of said fall to store enough energy to return the fallen cassette holder thru a substantially vertical path immediately to its original operative position after the removal of the cassette from the fallen cassette holder, and means to prevent destructive shock to the cassette by reason of its fall.

2. In a cassette changer, a plurality of cassette holders, means for retaining said cassette holders against the force of gravity, electromagnetic means for releasing said holders whereby at least one of them is allowed to fall, guide means for making the fall substantially vertical, retracting means actuated by the force of said fall to store enough energy to return the fallen cassette holder thru a substantially vertical path immediately to its original position after the removal of the cassette from the fallen cassette holder, means for guiding the fall of another cassette holder into the position occupied by the first prior to its fall and means to prevent destructive shock to the cassette by reason of its fall.

3. In a cassette changer, a pair of cassette holders, an electromagnet having a core, said core being adapted to hold one of said casette holders against the force of gravity except when the magnet is energized, means for guiding the fall of the cassette holders whereby one has a short forward fall and the other a long vertical fall, said means being adapted to enable the second holder to occupy, after the fall of the first, the position originally held by the first, said position being adapted for radiography and a retracting means attached to the first or furthest fallen cassette holder, said means being adapted to lift the first cassette holder back into radiographic position promptly on removal of the cassette from said holder.

4. A cassette changer which comprises a front cassette holder and a rear cassette holder, a housing for supporting said holders, electro-magnetic retaining means allowing upon actuation thereof, the first of said holders to fall a considerable distance, means for guiding the second cassette holder into the position, formerly occupied by the first, said position being adapted for radiography, a cassette holder retracting device, means for storing in said device energy derived from the fall of the holder, the amount of said energy being sufficient to restore the first cassette holder back to radiography position upon removal of the cassette therefrom.

5. A cassette changer comprising a frame, a pair of cassette holders within said frame, a lead backing for the first of said holders, said holder being normally in the radiography position and supporting the second holder against falling into the position occupied by the first, an electromagnet normally holding the first cassette holder against dropping, a retracting device energizable by the dropping of the first cassette holder adapted to return said holder to radiography position after the removal of the cassette therefrom, and shock absorbing means adapted to break the fall of the first cassette holder.

6. A cassette changer comprising a standard, a case of substantial length vertically adjustable on said standard, two cassette holders in said case, a lead backing on the front cassette holder, a triangular guide on the bottom of the rear cassette holder, a bow extending from the bottom edge of the first holder and substantially around the second holder, a link holding the second holder in an off center forward falling position, a strap extending from the said bow to an electro-magnet, an electromagnet having a bevelled core engaging with said strap except when the magnet is energized, a retracting means comprising a spring, said spring being capable of returning a fallen cassette holder upon removal of the cassette therefrom, said retracting means being attached to said strap by a flexible member, guide members for directing the fall of the first cassette holder and a pneumatic cylinder having a piston return spring, said cylinder being arranged to break the fall of the first holder.

7. In a cassette changer a first cassette holder, a lead backing thereon, control means for dropping said changer out of radiography position, a second cassette holder, gravity actuated means for moving the latter to radiography position after the dropping of the former, a triangular guide on the bottom of said second mentioned holder, the position of said guide being that a slanting or oblique surface of comparatively gentle incline can engage the upper edge of the fallen cassette holder, and spring actuated means to impart an upward motion to said fallen cassette holder after removal of the cassette therefrom whereby the second mentioned holder is automatically moved backward out of radiography position, partly by reason of the upward and backward push imparted to it by engagement of the rising cassette with the oblique guide surface.

WILLIAM MAXWELL LEE.